United States Patent [19]

Whisker

[11] Patent Number: 4,780,828

[45] Date of Patent: Oct. 25, 1988

[54] MAILING SYSTEM WITH RANDOM SAMPLING OF POSTAGE

[75] Inventor: Robert H. Whisker, Pelham, N.Y.

[73] Assignee: Pitney Bowes Inc., Stamford, Conn.

[21] Appl. No.: 813,447

[22] Filed: Dec. 26, 1985

[51] Int. Cl.[4] .......... G06F 15/24

[52] U.S. Cl. .......... 364/464.02; 380/23

[58] Field of Search .......... 364/464, 406, 478, 900, 364/466, 555, 552, 554, 401; 235/425, 432, 433, 419, 494, 495; 209/900; 388/23

[56] References Cited

U.S. PATENT DOCUMENTS

| | | | |
|---|---|---|---|
| 4,126,779 | 11/1978 | Towers et al. | 235/432 |
| 4,172,552 | 10/1979 | Case et al. | 235/432 |
| 4,264,782 | 4/1981 | Konheim | 178/22 |
| 4,264,808 | 4/1981 | Owens et al. | 235/432 |
| 4,393,454 | 7/1983 | Soderberg | 235/432 |
| 4,447,890 | 5/1984 | Duwel et al. | 364/900 |
| 4,481,604 | 11/1984 | Gilham et al. | 364/464 |
| 4,498,187 | 2/1985 | Soderberg et al. | 364/466 |
| 4,511,793 | 4/1985 | Racanelli | 364/466 |
| 4,516,209 | 5/1985 | Scribner | 209/900 |
| 4,525,788 | 6/1985 | Gottlieb et al. | 364/478 |
| 4,527,791 | 7/1985 | Piotroski | 364/478 |
| 4,574,352 | 3/1986 | Coppola et al. | 364/466 |
| 4,578,759 | 3/1986 | Horii | 364/478 |
| 4,589,555 | 5/1986 | Hollingsworth | 209/900 |
| 4,639,873 | 1/1987 | Baggarly et al. | 364/478 |
| 4,641,347 | 2/1987 | Clark et al. | 235/432 |
| 4,649,266 | 3/1987 | Eckert | 235/432 |
| 4,713,761 | 12/1987 | Sharpe et al. | 364/406 |

OTHER PUBLICATIONS

Commonly Assigned Copending Application Ser. No. 756,420; Murem Sharpe et al.; filed 7/18/85.

*Primary Examiner*—Parshotam S. Lall

*Assistant Examiner*—S. A. Melnick

*Attorney, Agent, or Firm*—Robert H. Whisker; Melvin J. Scolnick; David E. Pitchenik

[57] ABSTRACT

A system for accounting for postage on large batches of mail without franking of each mail piece. The system includes an intelligent inserter system or automatic weighing system for generating postage determining information for mail pieces in a large batch of mail and a printer or scanner for serializing the batch by either imprinting each piece with a serial number or scanning for pre-printed serial numbers. The postage determining information and serial numbers are transmitted to a manifest system which generates a manifest (i.e., a matched list of serial numbers and postage) and computes the total postage due on the batch. In one disclosed embodiment, the manifest system then selects a random sample of the manifest, encrypts the serial numbers and transmits this encrypted sample to a data processing center. The data processing center decrypts the sample and transmits it to the post office handling the batch of mail so that the computed total postage may be verified with a particular confidence level and concurrently transmits instructions to a trustee bank to pay the postage due to the postal service out of a pre-established account. The random selection and encryption schemes are kept secure to avoid the possibility that a mailer may tamper with the selected sample. In another embodiment, the encrypted random sample is output on a printer, and the printed output is then metered in a conventional postage meter in payment of the total postage due. In another embodiment, an unencrypted random sample is output on a printer in response to an access code entered by a postal service employee and this unencrypted sample is then metered with a conventional postage meter in payment of the total postage due.

23 Claims, 5 Drawing Sheets

MAILING SYSTEM WITH RANDOM SAMPLING OF POSTAGE

BACKGROUND OF THE INVENTION

This invention relates to a system for accounting for postage costs. More particularly, it relates to such a system for use by high volume mailers.

High volume mailers, mailers who typically mail thousands of pieces of first class mail at a time, incur correspondingly high postage costs and continually seek means to control these costs. Typical of such high volume mailers are credit card companies, banks, utilities, or oil companies; all of whom communicate with a large customer base through first class mail.

To control these costs, high volume mailers have typically invested large sums of money in automatic equipment to handle large mailings. Such equipment typically includes large multi-station intelligent inserter systems which select, assemble and insert appropriate materials into envelopes. To minimize the postage charges, such inserter systems may also determine the postage for each mail piece in a batch of mail to ensure that each mail piece receives no more than the necessary postage. Automatic weighing systems (AWS) to sequentially weigh each mail piece in a batch of mail and compute the appropriate postage have also been proposed. Such systems are described in U.S. Pat. Nos. 3,890,492; for: Postage Value Determining and Control Circuit; to: Manduley et al; issued: June 17, 1975, and 4,497,040; for: Method and Apparatus for Customizing a MultiStation Document Inserter; to: Gomes et al; issued: Jan. 29, 1985, which are hereby incorporated by reference.

Though equipment of this type has provided satisfactory service in the past, a problem arising out of the regulations of various postal services, such as those of the United States Postal Service (USPS), which require that each mail piece be individually franked (i.e., that appropriate indicia be placed on each mail piece indicating the amount of postage paid for that mail piece) remains. Clearly, stamps are an impossible solution for the high volume mailer and prestamped envelopes or permit mail do not allow the mailer to minimize his costs for postage with respect to the weight of the mail pieces. A common solution to this franking problem has been the use of postage meters in conjunction with mail handling equipment of the kinds described above. Mail pieces in a batch of mail would sequentially pass through a postage meter to be imprinted with indicia indicative of the postage determined for each mail piece. (Postage meters are well known devices which may be preset, upon payment to the postal service, with a dollar amount, and then imprint postage indicia in selected amounts up to the preset total.) Though postage meters have proven to be an effective solution to the franking problem they are perceived as having certain problems. Because the postage indicia is mechanically imprinted on each mail piece they tend to slow down the processing a batch of mail, particularly where the postage amount in a batch varies from mail piece to mail piece requiring that the meter be frequently reset to a different postage amount. Further, the meter adds another subsystem to the mail handling equipment whose failure halts operations and prevents the mailer from using postage already paid for. The question of reliability is aggravated by the need to maintain meter security; which means that meters may be only repaired and maintained by the postage meter vendor.

In response to these perceived problems of high volume mailers with postage meters it has been suggested that postal regulations be revised to eliminate the franking requirement for each mail piece and that the postal services accept mail on a manifest basis. That is, the mailer would provide the postal service with a list of each mail piece and the corresponding postage. The mailer would then be billed for the total postage in a lump sum. The postal service could then verify that the total postage was correct by checking each mail piece in the batch against the manifest, or more efficiently by checking a sampling of the batch against the manifest.

There are, however, problems to accounting for postage for large batches of mail. If a manifest is generated by a data processing system which initially generates the information defining the batch, it will include mail pieces which may be accidentally lost in assembling the batch, for example pieces lost in inserter jams.

Also, the amount of information in a manifest or a large batch of mail, which may include thousands or even tens of thousands of mail pieces, is very great. If such large quantities of information were transmitted to the postal service electronically, transmission costs could be substantial and the postal service would require equipment to receive and store large quantities of data. If the information were delivered to the postal service on transportable media such as floppy disks, there would be a possibility of data loss due to damage to the disks which are susceptible to heat, magnetic fields, spilled coffee, etc. Transportation of a complete manifest in a more secure form such as a printout would of course be cumbersome. Problems would also exist in checking the manifest against the actual batch of mail. If a sampling technique were used, the level of confidence which could be placed in a sample would be dependent upon proper selection of that sample, and given the unfamiliarity of postal workers with sampling techniques, errors could well occur in properly checking batches of mail. Problems could also exist for mailers using a manifest to pay for first class mail. High volume mailers are large organizations which typically have internal controls on payments and which may take several days simply to cut a check. If postal service would be willing to eliminate the franking requirement for first class mail and also submit bills for postage, rather than operate on a prepayment basis, high volume mailers would need to institute new procedures for payment for postage.

Accordingly, it is an object of the subject invention to provide a system for accounting for postage costs for large batches of mail which will accurately reflect the batch as actually assembled.

It is another object of the subject invention to provide a system for accounting for postage costs for high volume mailers on a manifest basis which will substantially reduce the amount of information which must be provided to the postal service.

It is another object of the subject invention to provide a system which will simplify verification of the postage paid on a batch of mail.

It is still another object of the subject invention to provide a system which will simplify payment of postage and will require minimal changes in existing procedures for payment of postage.

BRIEF SUMMARY OF THE INVENTION

The above objects are achieved and the disadvantages of the prior art are overcome in accordance with the subject invention by means of a system which receives serial numbers from a serializing apparatus and corresponding postage determining information from apparatus for generating such information for substantially all of the mail pieces in a batch of mail and generates a manifest. (Postage determining information, as used herein, may be information such as weight from which postage can be computed or may be precomputed postage amounts; as, for example, based on the number and type of inserts going into a given mail piece.) In one preferred embodiment, the system then determines the postage for each mail piece and the total postage for the batch and selects a random sample of serial numbers and corresponding postage amounts. The system then encrypts each selected serial number and outputs the encrypted sample and the total postage due, so that a person having knowledge of the appropriate decryption scheme may identify the selected batch and verify the corresponding postage for each selected mail piece to determine a confidence level that the percentage of mail pieces having incorrectly determined postage does not exceed a predetermined level. It is a feature of the system of the subject invention that the selecting and encrypting functions are both secure so that the sample may not be identified without knowledge of the appropriate decryption scheme.

In another preferred embodiment of the subject invention the system further includes a data processing center which receives the output encrypted sample and communicates with a trustee bank to request payment of the total postage due to the postal service, and decrypts the sample and transmits it to the postal service so that the total postage for the batch may be verified at the Post Office.

In another preferred embodiment of the subject invention the encrypted sample is output by the system as a printout or on other tangible media and a postage meter is set to the total postage for the batch, and the printout is then metered with the total postage in payment of postage due for the batch.

In still another preferred embodiment of the subject invention an unencrypted sample is output as tangible copy in response to an access code entered by an employee of the postal service and metered as described in the preceding paragraph.

Thus, it may be seen that the subject invention advantageously provides a system for accounting for postage costs for large mailings which eliminates the need for franking, reduces the amount of information to be transmitted, ensures proper sampling and allows mailers to pay postage costs with minimal changes to their existing procedures. Other objects and advantages of the subject invention will be apparent to those skilled in the art from consideration of the attached drawings and the detailed description set forth below.

DETAILED DESCRIPTION OF PREFERRED EMBODIMENTS OF THE SUBJECT INVENTION

Figure 1:
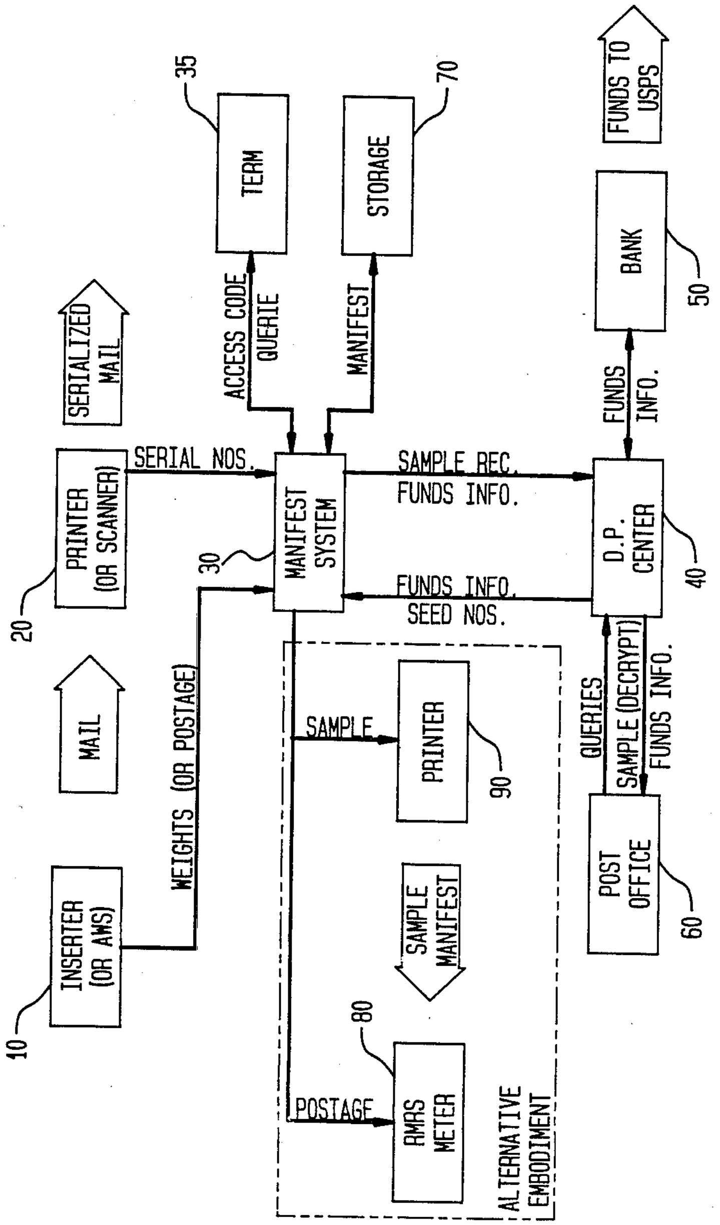
FIG. 1 shows a schematic block diagram of a system in accordance with the subject invention.

FIG. 1 shows a system in accordance with the subject invention. Inserter 10 processes a batch of mail to produce a sequential flow of mail pieces and determine corresponding weights or postage for each mail piece. (Without departing from the scope of the subject invention an AWS which processes preassembled mixed weight mail may be substituted for inserter 10.) Inserter 10 computes the weight for mail pieces from an a priori knowledge of the weight of each insert and may also compute the appropriate first class postage from the known postal service first class rates and the weight. The weight or the pre-computed postage, hereinafter postage determining information, is transmitted to manifest system 30 synchronously with the sequential flow of mail pieces through printer 20. Printer 20 serializes the batch by imprinting a serial number on each mail piece and transmitting those serial numbers to manifest system 30. In another embodiment of the subject invention a bar code or OCR scanner may be substituted for printer 20 to scan preprinted serial numbers from mail pieces as they are processed by inserter 10. (By serializing herein is meant the transmission of serial numbers, or other information identifying each mail piece, corresponding to the postage determining information for each mail piece in a batch).

Those skilled in the art will recognize that since batches of mail are generally assembled in accordance with instructions generated by an off-line computer system such an off-line system could also generate a manifest for each such batch. However it is believed preferable to assemble the manifest information from the output of inserter 10 since mail pieces are occasionally lost in assembling a batch as a result of jams or other mechanical failures.

Manifest system 30 receives the synchronous stream of serial numbers and postage determining information, computes postage if necessary, computes the total postage and total weight for the batch and stores the information as a manifest for the batch in storage system 70, which is preferably some form of conventional magnetic media storage.

Figure 2:
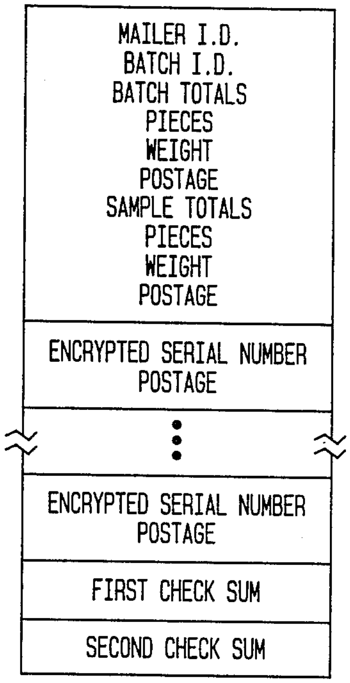
FIG. 2 shows a representation of an encrypted sample record.

Once the manifest is completed manifest system 30 then randomly selects a sampling of a predetermined size of the manifest and generates a sample record as shown in FIG. 2. The sample record would include a header which would include a mailer identification, batch identification, batch totals for the number of pieces; the total weight; and the total postage, and sample totals for the number of pieces in the sample; the sample weight; and the total sample postage. The body of the sample record as shown in FIG. 2 would include encrypted serial numbers and the associated postage for each mail piece selected in the sample. The sample record of FIG. 2 would also include two checksums, a first encrypted checksum derived from the unencrypted selected serial numbers and the remaining information in the sample record which would protect against alteration of unencrypted information in the sample record, and a second unencrypted checksum derived from the encrypted serial numbers and all other information in the sample record including the first checksum which would provide a conventional check for transmission errors.

While it would be possible to protect against alteration of information such as the total postage by simply encrypting the entire sample record it is believed preferable to leave such information in unencrypted form for the benefit of the mailer.

It should also be noted that the total sample postage is a statistical predictor of the total postage for the batch. Excessive discrepancy between the total sample postage and the total batch postage, or a consistent bias of the total sample postage would also indicate the possibility that the sample had been altered.

The random sample is encrypted to prevent the mailer from tampering with the selected sample. Accordingly, both the encrypting scheme and the random selection scheme should be secure so that the mailer cannot readily determine the identity of the selected sample. Several steps may be taken to ensure such security. The source code for the system may be kept secret, the object code in the system may be stored in read-only-memory so that it is not easily altered, and the system may be enclosed in a secure housing which will reveal signs of tampering. Further, it may be desirable that the encrypting scheme be a "public key" scheme. Such systems provide the sender of information with an algorithm for encryption of data but do not enable the sender to decrypt encrypted information. Such "public key" schemes have been described in the relevant literature (e.g., *WATCH OUT HACKERS, PUBLIC ENCRYPTION CHIPS ARE COMING,* Electronics Week, May 20, 1985) and a person skilled in the art could develop, or have developed by one having the necessary expertise, such an "public key" scheme. Accordingly, further explanaion of techniques for "public key" encryption is not believed necessary for an understanding of the subject invention and will not be provided herein. However, it should be noted that, although "public key" encryption is computationally intensive and relatively slow, the impact upon the subject invention is minimized because by the relatively small number of mail pieces required in a sample. For example, a sample size of 64 mail pieces if completely verified provides better than a 96% confidence level that at least 95% of the mail pieces in the batch have the correct postage (see Appendix). Similarly, the random selection scheme may be secured by using a pseudo-random number generation technique based on a secure seed number. (A pseudo-random number generator is an algorithm which generates an apparently random sequence of numbers based upon a particular input seed number.) A secure seed number may be generated from a natural phenomenon which is actually random. For example the state of a high speed counter may be sampled at an arbitrary time such as the initialization time of the system. Alternatively a seed number may be generated by the DP center 40 and transmitted to manifest system 30.

When manifest system 30 has encrypted the sample it transmits the sample and the total postage due for the batch to data processing center 40. DP center 40, which is remote from the mailing site, and not controlled by the mailer, decrypts the encrypted random sample and transmits the decrypted sample to post office 60 where the sample may be verified against the received batch of mail to establish a confidence level that the percentage of incorrect postage in the batch does not exceed a predetermined level. Concurrently DP center 40 also transmits instructions to a trustee bank 50 where the mailer has previously established an account, instructing bank 50 to pay to the postal service the total postage due.

The system of FIG. 1 also allows communication through manifest system 30 and DP center 40 to verify that funds are available and that postage due has been paid. Thus the mailer may query manifest system 30 through terminal 35 to determine if adequate funds are available. The message would be transmitted through DP center 40 to bank 50 and an answer returned to the mailer. Similarly post office 60 may query DP center 40 to verify that the postage due has been paid by bank 50.

Figure 5:
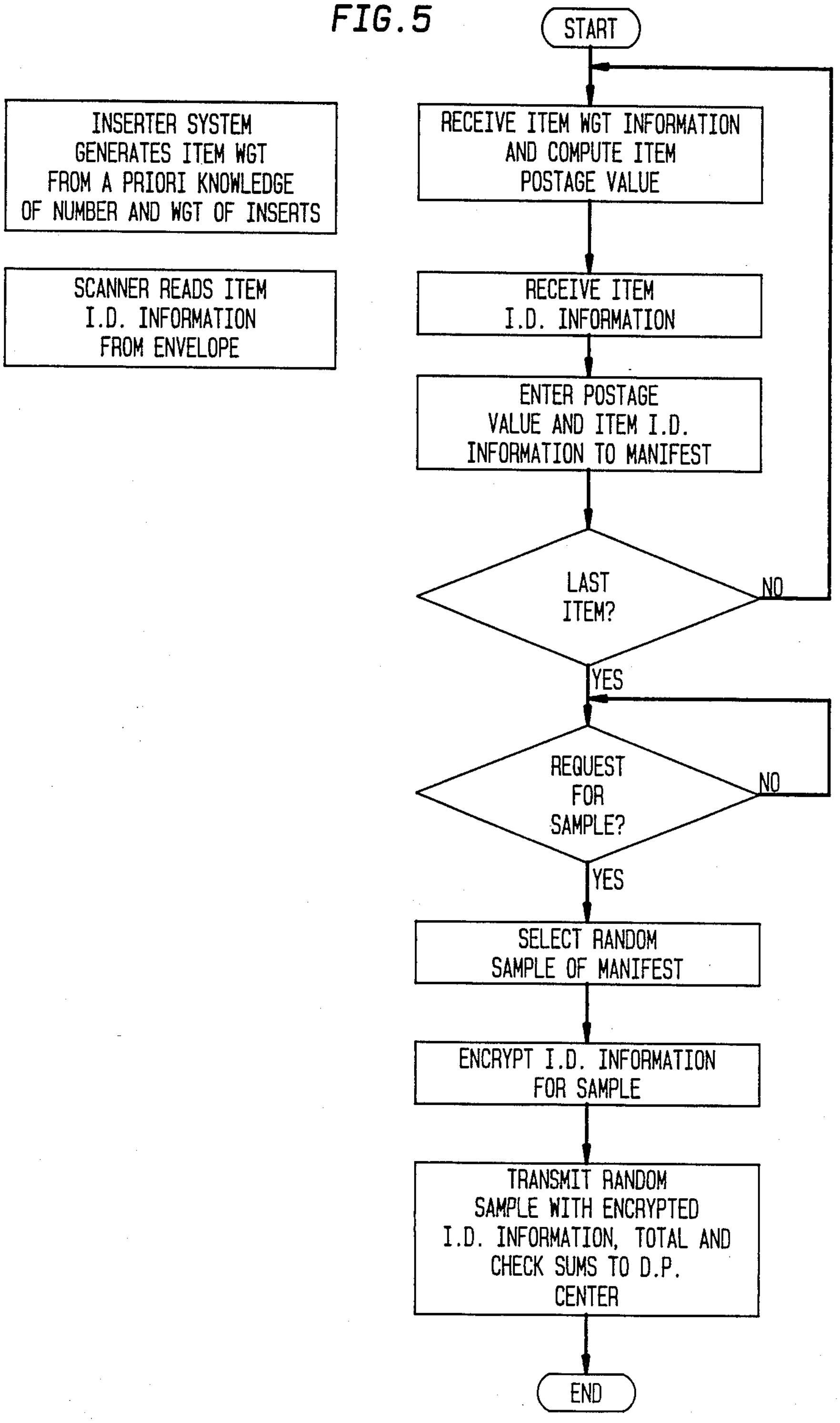
FIG. 5 shows a flow chart of the operation of a manifest system in accordance with the subject invention.
Figure 6:
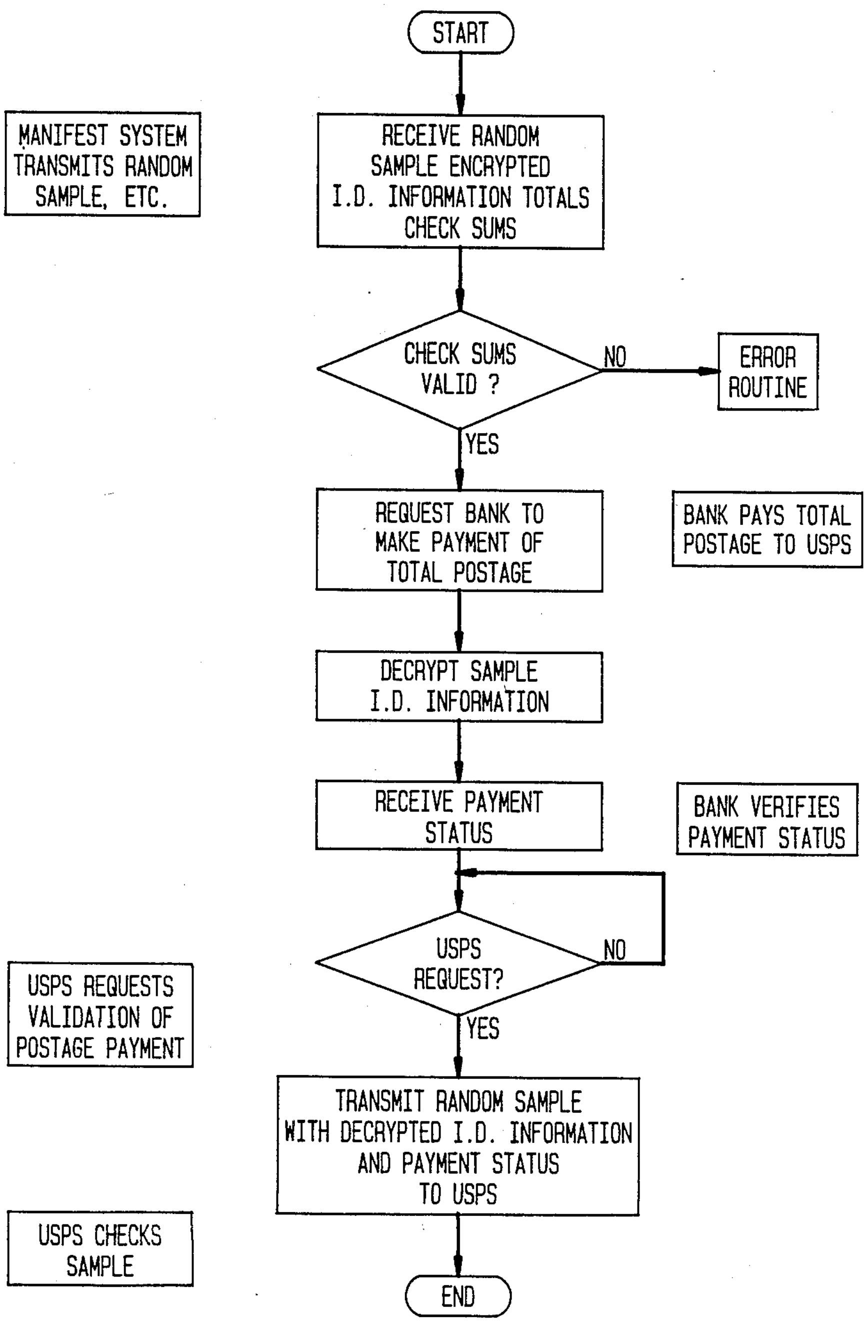
FIG. 6 shows a flow chart of the operation of a data processing center in accordance with the subject invention.

Operation of a preferred embodiment in accordance with the above description may be better understood by consideration of FIG. 5, which shows a flow chart of the operation of manifest system 30, and FIG. 6, which shows a similar flow chart of the operation of DP center 40.

Other embodiments of the subject invention are also shown in FIG. 1. These embodiments could be used for stand alone operation without need for a data processing center and may be used either as a backup in case DP center 40 is unavailable or may prove useful in a dedicated stand alone configuration. In the first alternative embodiment an encrypted random sample as shown in FIG. 2 is printed on printer 90, or transferred to some other equivalent form of transportable media. Concurrently, manifest system 30 sets a conventional postage meter to the total postage determined for the batch. The printed sample may then be metered (i.e., franked with the postage value) in payment of the postage due for the batch and the metered encrypted random sample delivered with the batch to the postal service.

Figure 3:
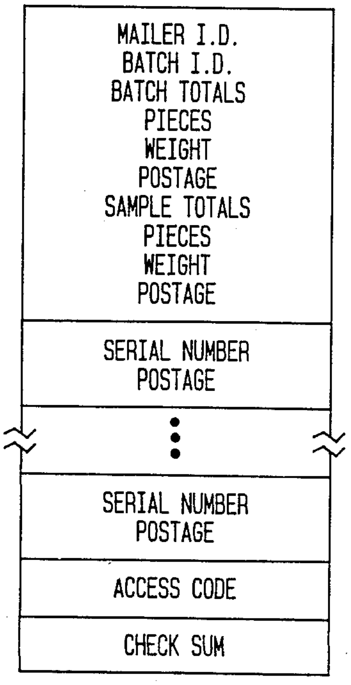
FIG. 3 shows a representation of an unencrypted sample record.

In the embodiment described in the preceding paragraph, the postal service would be required to decrypt the printed sample to verify it. This may be avoided by another embodiment where the sample is printed as shown in FIG. 3 without encryption in response to an access code entered by an employee of the postal service through terminal 35. To avoid inadvertent disclosure of the access code to the mailer the code may be changed for each batch; for example, in accordance with techniques taught in U.S. Pat. No. 4,447,890; for: Remote Postage Meter System Having Variable User Authorization Code; to: Duwel et al; issued: May 8, 1984, which is hereby incorporated by reference. Also, this embodiment is believed most effective when used with pre-printed serial numbers which would include an arbitrary indicia which would be difficult to duplicate, and with the sample as a pseudo-random function of the access code (e.g., the access code is the seed number for a pseudorandom number generator). This would increase the difficulty of collusion between the postal service employee and the mailer to substitute the sampled mail pieces or prepare a counterfeit printed sample.

To avoid the problem of maintaining large amounts of funds in postage meter 80, or the need to take it to the postal service for recharging, in both of the above described embodiments that meter 80 can be a remotely rechargeable meter. Such remotely rechargeable meters are well known and are marketed by Pitney Bowes Inc. of Stamford, Connecticut under the trademark RMRS. These meters allow a mailer to obtain a code number which enables him to enter additional postage into a meter simply by placing a call to a data processing center.

The need for encryption can also be reduced by transmitting only the sample postage charges without corresponding identifying information. The postal service or DP center 40 may then regenerate the sample from the pseudorandom number generator and the seed number. The seed number may either be transmitted in encrypted form or may have been provided originally by DP center 40.

The full manifest stored in storage unit 70 may be maintained for a pre-determined period of time in case disputes arise. Alternatively, if the media in storage unit 70 is transportable it may be delivered directly to the postal service in place of any encrypted sample. Also if it is desired to avoid the difficulties of random sampling and encryption the complete manifest may be transmitted to data processing center 40 or printed on printer 90 in any of the above described embodiments.

The above embodiments have been given by way of illustration only and other embodiments of the subject invention will be apparent to those skilled in the art from consideration of the detailed description and the attached drawings. Accordingly limitations on the subject invention are to be found only in the claims set forth alone.

APPENDIX

Figure 4:
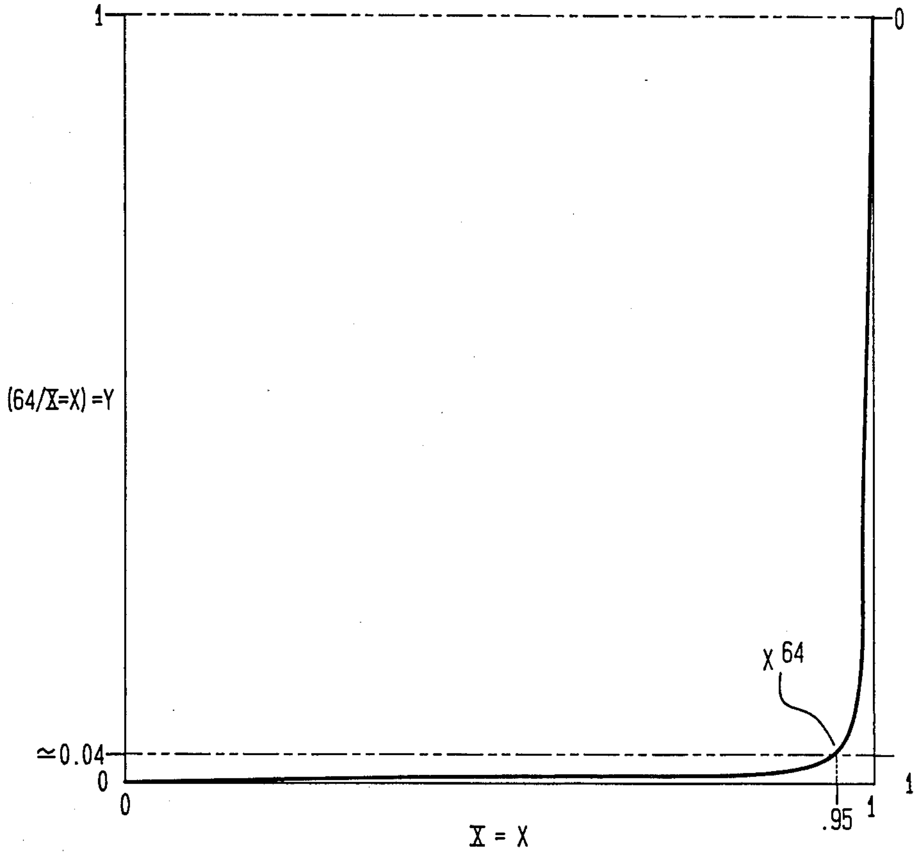
FIG. 4 shows a plot of the conditional probability that a sample of 64 items will be completely valid assuming that the fraction of valid items, X, =x versus x.

Assume that the actual fraction of mail pieces in a batch having the correct postage is a random variable, X, and that a random sample of size n is selected (with replacement). The probability, $P(S_{64})$, that this sample will consist only of mail pieces having the correct postage is a function of the value, x, taken on by X. FIG. 4 shows such a function for n=64. From FIG. 4 we can write the conditional probability that the sample (with n=64) will be completely correct, assuming X=x, as:

$$P(S_{64}|X = x) = x^{64} \text{ and the probability assuming}$$

$$a \leqq X \leqq b \text{ as:}$$

$$P(S_{64}|a \leqq X \leqq b) = \int_a^b f(x)\,dx / \int_a^b f(x)dx; \text{ where}$$

f(x) the distribution function of X. For the conservative assumption that f(x)=1 (i.e., X is equally likely to take on any value):

$$\int_a^b f(x)dx = b - a$$

$$P(S_{64} | a \leqq X \leqq b) = \frac{1}{b-a}\int_a^b x^{64}\,dx; \text{ and for } a = 0:$$

$$P(S_{64} | 0 \leqq X \leqq b) = \frac{1}{b}\int_a^b x^{64}\,dx.$$

We may then compute the conditional probability that $0 \leqq X \leqq b$ assuming the sample is completely correct as:

$$P(0 \leqq X \leqq b|S_{64}) = \frac{P(S_{64} | 0 \leqq X \leqq b)\,P(0 \leqq X \leqq b)}{P(S_{64})}$$

substituting:

-continued $$P(S_{64}) = P(S_{64} | 0 \leqq X \leqq 1) = \frac{1}{1}\int_o^l x^{64}\,dx$$

$$P(0 \leqq X \leqq b) = \int_o^b f(x)\,dx = \int_o^b dx = b$$

we get:

$$P(0 \leqq X\, b \,|\, S_{64}) =$$

$$\frac{\frac{1}{b}\int_o^b x^{64}dx \int_o^b dx}{\int_o^l x^{64}dx} = \frac{\frac{1}{65b}\,x^{65}\Big|_o^b \;\; x\Big|_o^b}{\frac{1}{65}\,x^{65}\Big|_o^l} = b^{65}$$

That is, if a sample of size 64 is completely correct, then the probability that $b < X \leqq 1 = 1 - b^{65}$. (More generally $P(b < X < 1 - S_n) = 1 - b^{n+1}$).

For b=0.95:

$$P(0.95 \leqq X \leqq 1 - S_{64}) = 1 - (0.95)^{65} > 0.96$$

Similar, but more complex, computations may be made where the sample is less than copletely correct.

What is claimed is:

1. A system for accountign for postage on large batches of mail, comprising:

(a) means for receiving identifying information and corresponding postage determining information for sustantially all pieces of mail in said batch;

(b) means, responsive to said receiving means, for determining postage from said corresponding postage determining information for each of said pieces and the total postage due on said batch;

(c) means, responsive to said determining means, for selecting a random sample of said batch, said sample comprising identifying information and postage for corresponding pieces selected;

(d) means, responsive to said selecting means, for at least partly encrypting said sample by encrypting each item of said selected identifying information to provide an encrypted sample comprising said selected identifying information in encrypted form and said postage for corresponding pieces;

(e) said random selecting means and said encrypting means each being secure from the mailer of said batch so that said sample is substantially unidentifiable by said mailer from said encrypted sample;

(f) means, responsive to said encrypting means, for outputting said encrypted sample and said total postage due, whereby a person having knowledge of an approriate decryption scheme may identify said batch and verify said coresponding postage for each of said selected pieces to determine a confidence level that the percentage of said pieces in said batch having incorretly determined postage does not execeed a predetermined value.

2. A system as described in claim 1 further comprising:

(a) means for generating said postage determining information; and,
(b) means for serializing said pieces and thereby providing said identifying information.

3. A system as described in claim 2 wherein aid postage determining information generating means comprises n intelligent inserter system or an automatic weighing system.

4. A system as described in claim 1 wherein said output means outputs said encrypted sample and said total postage due to a data processing center.

5. A system as described in claim 4 wherein said data processing center decrypts said encrypted sample and transmits said decrypted sample to the post office handling said batch.

6. A system as described in claim 4 wherein said data processing center transmits requests to a financial institution to pay said total postage due.

7. A system as described in claim 1 wherein said output means outputs said encrypted sample to a printer to provide a printout of said encrypted sample.

8. A system as decribed in claim 7 wherein said output means outputs said total postage due to a postage meter to set said meter; whereby said printout of said encrypted sample may be metered with an amount equal to said total postage due in said postage meter in payment of said total postage due.

9. A system as described in claim 2 wherein said serializing means comprises a printer for imprinting said mail pieces with said identifying information.

10. A system as decribed in claim 2 wherein said serializing means comprises a scanner for scanning said identifying information from indicia pre-printed on said mail pieces.

11. A system as described in claim 1 wherein said identifying information is imprinted on said mail pieces in machine readable form.

12. A system as described in claim 1 further comprising means for protecting said total postage due from alteration after output.

13. A system as decribed in claim 2 further comprising means for protecting said total postage due from alteration after output.

14. A system as described in claim 4 further comprising means for protecting said total postage due from alteration after output.

15. A system as described in claim 8 further comprising means for protecting said total postage due from alteration after output.

16. A system for accounting for postge on large batches of mail, comprising:
(a) means for receiving identifying information and corresponding postage determining information for substantially all pieces of mail in said batch;
(b) means for determining postage from said determining information for each of said mail pieces and the total postage due on said batch;
(c) means for selecting a random sample of said batch, said sample comprising selected identifying information and postage for corresponding mail pieces; and,
(d) means for outputting said sample and said total postage due, in response to an access code entered by an operator, said access code being secure from the mailer of said batch.

17. A system as described in claim 16 wherein said output means outputs said total postage due to a postage meter to set said meter; whereby a printout of said sample may be metered with an amount equal to said total postage due in said postage meter in payment of said total postage due.

18. A system as described in claim 16 wherein said system changes said access code for subsequent operations in response to entry of said access code, so as to prevent disclosure of said access code.

19. A system as described in claim 17 wherein said system changes said acess code for subsequent operations in response to entry of said access code, so as to prevent disclosure of said access code.

20. A system as described in claim 16 wherein said sample is a pseudo-random function of said access code.

21. A system as described in claim 18 wherein said sample is a pseudo-random function of said access code.

22. A system as described in claim 16 wherein said mail pieces are pre-printed with said identifying information, said identifying information including an arbitrary indicia.

23. A system as described in claim 18 wherein said mall pieces are pre-printed with said indentifying information, said identifying information including an arbitrary indicia.

* * * * *